(12) United States Patent
Houser et al.

(10) Patent No.: US 6,472,494 B2
(45) Date of Patent: Oct. 29, 2002

(54) SPANDEX WITH HIGH HEAT-SET EFFICIENCY

(75) Inventors: Nathan E Houser, Afton, VA (US); Gordon W Selling, Waynesboro, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 51 days.

(21) Appl. No.: 09/790,422

(22) Filed: Feb. 22, 2001

(65) Prior Publication Data

US 2001/0044517 A1 Nov. 22, 2001

Related U.S. Application Data

(63) Continuation-in-part of application No. 09/558,564, filed on Apr. 26, 2000, now abandoned.

(51) Int. Cl.[7] .................. C08G 18/76; C08G 18/48; C08G 18/10; C08G 18/32
(52) U.S. Cl. ............... 528/61; 528/59; 528/64; 528/67; 528/76; 528/906
(58) Field of Search .............. 528/59, 61, 64, 528/67, 76, 906

(56) References Cited

U.S. PATENT DOCUMENTS

| | | | |
|---|---|---|---|
| 3,631,138 A | 12/1971 | Peters | 524/871 |
| 4,973,647 A | 11/1990 | Bretches et al. | 528/61 |
| 5,000,899 A | 3/1991 | Dreibelbis et al. | 264/205 |
| 5,539,037 A | 7/1996 | Iqbal | 524/394 |
| 5,644,015 A * | 7/1997 | Seo et al. | 528/60 |
| 5,723,563 A * | 3/1998 | Lawrey et al. | 528/61 |
| 5,879,799 A | 3/1999 | Yosizato et al. | 428/364 |
| 5,948,875 A | 9/1999 | Liu et al. | 528/61 |
| 5,981,686 A | 11/1999 | Waldbauer, Jr. | 528/76 |

FOREIGN PATENT DOCUMENTS

| | | |
|---|---|---|
| JP | 7-82608 | 9/1993 |
| JP | 8-20625 | 1/1996 |
| JP | 8-176253 | 7/1996 |
| JP | 8-176268 | 7/1996 |

OTHER PUBLICATIONS

Oertel; *Polyurethane Handbook: Chemistry –Raw Materials –Processing –Applications –Properties*; Hanser Publishers; New York; 1985; pp. 68 and 69.*

* cited by examiner

*Primary Examiner*—Rabon Sergent

(57) ABSTRACT

A high heat-set efficiency, high unload power spandex, based on a polyurethaneurea prepared from a polyether glycol, mixtures of 2,4'-MDI and 4,4'-MDI, and chain extenders, is provided.

9 Claims, No Drawings

SPANDEX WITH HIGH HEAT-SET EFFICIENCY

CROSS REFERENCE TO RELATED APPLICATION

This application is a continuation-in-part of application Ser. No. 09/558,564, filed Apr. 26, 2000, now abandoned.

FIELD OF THE INVENTION

The present invention is related to high heat-set efficiency, high unload power spandex and, more particularly, to spandex prepared from a polyether glycol, a mixture of 2,4'-MDI and 4,4'-MDI, and chain extender.

DESCRIPTION OF BACKGROUND ART

Spandex and spandex-containing fabrics and garments are typically heat-set to provide the fiber or fabric with good dimensional stability and to shape the finished garment. Typical heat-setting temperatures used in commercial operations are 195° C. for fabrics containing spandex and 6,6-nylon, 190° C. when the fabric contains 6-nylon, and 180° C. when the fabric contains cotton. It is desirable to heat-set fabrics containing cotton and spandex, but if the spandex has adequate heat-set efficiency only at temperatures used for nylon-containing fabrics, the spandex cannot be properly heat-set in cotton-containing fabrics, which will be damaged by exposure to the required high temperatures.

A variety of methods has been used to improve the heat-set efficiency of spandex and thereby lower the temperature at which the spandex can be heat-set. For example, the use of 15–32 mole % of 2-methyl-1,5-pentanediamine as a coextender in making spandex is disclosed in U.S. Pat. No. 4,973,647, but such low levels do not provide spandex with sufficiently high heat-set efficiency at the moderate temperatures permitted for fabrics containing cotton. U.S. Pat. Nos. 5,000,899, 5,948,875 and 5,981,686 disclose the use of high proportions of 2-methyl-1,5-pentanediamine and 1,3-diaminopentane chain extender, respectively, to increase the heat-set efficiency of spandex, but making such large changes to the polymer can deleteriously affect fiber properties. U.S. Pat. No. 5,539,037 discloses the use of low concentrations of alkali metal carboxylates and thiocyanate in spandex to increase its heat-set efficiency. However, such salts can be removed by dissolution during fabric processing, and their effectiveness can thereby be reduced.

Japanese Published Patent Application JP7-82608 discloses the incorporation of 3–13 moles of isocyanato-2-[(4'-isocyanatophenyl)methyl]benzene ("2,4'-MDI") with 1-isocyanato-4-[(4'-isocyanatophenyl)methyl]-benzene ("4,4'-MDI") and, further, that at levels above 13 mole % 2,4'-MDI, the properties of the resulting spandex are said to be unacceptable at elevated temperatures.

Japanese Published Patent Applications JP08-020625, JP08-176253, and JP08-176268 and U.S. Pat. Nos. 3,631,138 and 5,879,799 also disclose the use of various levels of 2, 4'-MDI, but the properties of spandex made from such compositions do not have the desired combination of high heat-set efficiency, elongation, and unload power.

There remains a need for improving the heat-set efficiency of spandex.

SUMMARY OF THE INVENTION

The spandex of present invention, having a heat-set efficiency at approximately 175–190° C. of ≧85%, is prepared from poly(tetramethylene-co-2-methyltetramethylene ether) glycol, a mixture of 1-isocyanato-4-[(4'-isocyanatophenyl)methyl]benzene (4,4'-MDI) and 23–55 mole %, based on total diisocyanate, of 1-isocyanato-2-[(4'-isocyanatophenyl)methyl] benzene (2,4'-MDI), and at least one chain extender.

DETAILED DESCRIPTION OF THE INVENTION

It has now been unexpectedly found that the heat-set efficiency of spandex prepared with elevated levels of 2,4'-MDI in mixtures of 4,4'-MDI and 2,4'-MDI is significantly improved over that observed when low levels of 2,4'-MDI are present. As heat-set temperature rises, so too does heat-set efficiency, and the improvement observed in the spandex of the invention is useful and advantageous both at the low heat-set temperatures typical for fabrics containing spandex and cotton or wool and at the higher temperatures used for fabrics containing spandex and hard fibers such as nylon. At the same time, unload power is maintained, at least about 0.020 dN/tex, and elongation-at-break is increased.

As used herein, spandex means a manufactured fiber in which the fiber-forming substance is a long chain synthetic elastomer comprised of at least 85% by weight of a segmented polyurethane. The polyurethane is prepared from a polyether glycol, a mixture of diisocyanates, and a chain extender and then melt-spun, dry-spun or wet-spun to form the fiber.

The polyether glycols suitable for use in making the spandex of the present invention are poly(tetramethyleneether-co-2-methyltetramethyleneether) glycol and can have number average molecular weights of approximately 1500–4000 and the 2-methyltetramethyleneether moiety can be present in a range of approximately 4–20 mole %, based on the total ether moieties in the glycol. Such a copolyether can be prepared by copolymerization of tetrahydrofuran and 3-methyltetrahydrofuran.

A mixture of diisocyanates is used in making the spandex of the invention. At least approximately 45 moles % of the diisocyanate mixture is 4,4'-MDI, and approximately 23–55 mole % is 2,4'-MDI. The diisocyanate mixture is contacted with the polymeric glycol to make a capped glycol comprising a mixture of isocyanate-terminated glycols and unreacted diisocyanate. In order to obtain the desired heat-set efficiency, it is preferred that approximately 28–55 mole % of 2,4'-MDI is utilized, especially when a single chain extender is used.

The capped glycol is typically dissolved in a suitable solvent such as dimethylacetamide, N-methylpyrrolidone, or dimethylformamide, and then contacted with at least one difunctional chain extender to form the polymer and, optionally, with a monofunctional chain terminator to control the molecular weight of the polymer.

When a polyurethaneurea is desired, the chain extender is a diamine, for example ethylene diamine ("EDA"), 1,3- and 1,4-butanediamine, 1,3-diamino-2,2-dimethylbutane, 1,6-hexanediamine, 1,2-propanediamine ("1,2PDA"), 1,3-propanediamine, N-methylaminobis(3-propylamine) 2-methyl-1,5-pentanediamine ("MPMD"), 1,5-diaminopentane, 1,4-cyclohexanediamine, 1,3-diamino-4-methylcyclohexane, 1,3-cyclohexanediamine, 1,1'-methylene-bis(4,4'-diaminohexane), 3-aminomethyl-3,5,5-trimethylcyclohexane, 1,3-diaminopentane, m-xylene diamine, and mixtures thereof. Optionally, a chain terminator, for example diethylamine ("DEA"), cyclohexylamine, or n-hexylamine (typically used at 5–15 equivalent percent based on total amine ingredients) can be used to control the molecular weight of the polymer.

In particular, a mixture of EDA plus a diamine selected from the group consisting of MPMD, 1,4-cyclohexanediamine, 1,3-cyclohexanediamine, and 1,3-diaminopentane can be used, utilizing 60–95 mole % of EDA, based on total chain extender. The NCO moiety content in the capped glycol can be about 2.4–4.6 weight %.

The resulting solution of polyurethaneurea can then be wet- or dry-spun to form spandex. When the fiber spinning speed is high, for example above about 750 meters per minute, 2,4'-MDI is typically present at a level of 25–55 mole % in order to attain the high heat-set efficiency desired.

When a polyurethane is desired, the chain extender is a diol, for example ethylene glycol, 1,3-propane diol, or 1,4-butane diol. Such polyurethanes can be melt-spun, dry-spun, or wet-spun.

A variety of additives can also be used in the spandex of the invention, provided they do not detract from the beneficial aspects of the invention. Examples include delustrants such as titanium dioxide and stabilizers such as hydrotalcite, a mixture of huntite and hydromagnesite (for example used at about 0.75 wt %, based on fiber weight), barium sulfate, hindered phenols, and zinc oxide, dyes and dye enhancers, hindered amine light stabilizers, UV screeners, and the like.

In the Example, the percent isocyanate moiety content of the capped glycol was calculated from the following formula:

$$\%NCO = \frac{100 \times (2xNCO\ fw \times (C.R.-1))}{glycol\ mw + (C.R. \times diisocyanate\ mw)}$$

wherein "fw" means formula weight, "mw" means molecular weight, "C.R." means Capping Ratio (the molar ratio of diisocyanate to polymeric glycol), "glycol" means polymeric glycol, and "NCO" refers to the isocyanate moiety, whose formula weight is 42.02. For improved spinning continuity, it is preferred that the NCO-moiety content in the capped glycol used in making the spandex of the invention be about 2.4–4.6%.

In the Table, the sample labeled "Comp." is a Comparison Sample, outside the invention.

The strength and elastic properties of the spandex were measured in accordance with the general method of ASTM D 2731-72. Three filaments, a 2-inch (5-cm) gauge length and zero-to-300% elongation cycles were used for each of the measurements "as-is" from the windup, that is, without scouring or other treatment. The samples were cycled five times at a constant elongation rate of 50 cm per minute and then held at 300% extension for 30 seconds after the fifth extension. Load power, the stress on spandex during initial extension, was measured on the first cycle at 200% extension and is reported in the Tables in deciNewtons/tex and designated "LP". Unload power, the stress at an extension of 200% on the fifth unload cycle, is also reported in deciNewtons per tex; it is designated as "UP". The precision with which load and unload power can be measured was estimated to be ±0.0002 dN/tex. Percent elongation at break ("Eb") was measured on the sixth extension. Percent set was also measured on samples that had been subjected to five 0—300% elongation/relaxation cycles. Percent set ("% Set") was calculated as % Set=100($L_f$-$L_o$)/$L_o$, wherein $L_o$ and $L_f$ are the filament (yarn) length, when held straight without tension, before and after the five elongation/relaxation cycles, respectively.

To measure heat-set efficiency, the yarn samples were mounted on a 10-cm frame and stretched 1.5x. The frame (with sample) was placed horizontally in an oven preheated to 175° C. (unless otherwise noted) for 120 seconds The samples were allowed to relax and the frame to cool to room temperature. The samples (still on the frame and relaxed) were then immersed in a boiling water solution containing 0.14% Duponol® EP detergent for 60 min (to remove finish; available from DuPont). Then the samples (still on the frame and relaxed) were placed in boiling water (at ph=5, mock dye) for 30 min. The frame and samples were removed from the bath and allowed to dry. The length of the yarn samples was measured and heat set efficiency (HSE, as a percentage) was calculated according to the following formula:

$$HSE\% = \frac{\text{heat-set length} - \text{original length}}{\text{stretched length} - \text{original length}} \times 100$$

A spandex heat-set efficiency of at least about 85% at 175° C. is needed for use with fabrics containing spandex and cotton or wool. Similar heat-set efficiency can be achieved at 190° C. for use with hard fibers such as nylon.

To make mixtures of diisocyanate isomers utilized in the invention, MDI with a low 2,4'-isomer level (Isonate® 125 MDR, from Dow Chemical) and MDI high in the 2,4'-isomer (Mondur® ML, Bayer AG) were mixed in proportions to obtain the 2,4'-isomer levels shown in the Tables. GC analysis was performed on the starting diisocyanates using a 15-meter DB-1701 capillary column, programmed from 150–230° C. at 8°/min following an initial hold time of 2 min. This showed retention times of 15.5, 13.8 and 12.6 min for the 4,4'-, 2,4'-, and 2,2'-isomers, respectively. Isonate® 125 MDR, which is used commercially in making polyurethaneureas for spandex, was analyzed to contain 1.9 mole % of the 2,4'-isomer. In Mondur® ML, the molar 4,4'/2,4'/2,2'isomer distribution was determined to be 44.9/53.2/1.9. These results were substantially confirmed by $^1$H NMR analysis on a Varian 300 MHz Fourier transform spectrometer using $CDCl_3$ solvent, in which absorptions of the methylene hydrogens in the three isomers were observed at δ=3.90, 3.97, and 4.02 for the 4,4', 2,4', and 2,2'isomers, respectively.

The poly(tetramethyleneether) glycol ("PO4G") used in the Example for comparision purposes had a number average molecular weight of 1800 (Terathane® 1800, a registered trademark of E. I. du Pont de Nemours and Company), and the poly(tetramethyleneether-co-2-methyltetramethyleneether) glycol ("2MePO4G") had a number average molecular weight of 3500 and a 2-methyltetramethyleneether moiety level of 12.5 moles (Terathane® III, a registered trademark of E. I. du Pont de Nemours and Company).

Ethylenediamine ("EDA") used was UHP grade (Union Carbide). 2-Methyl-1,5-pentanediamine ("MPMD") used was Dytek® A (a registered trademark of E. I. du Pont de Nemours and Company).

The polyurethaneureas were prepared by contacting the MDI mixture with the polymeric glycol to form a mixture of isocyanate-terminated (capped) glycol and unreacted diisocyanate. DMAc was added, and the resulting solution was contacted with at least one chain extender and a small amount of chain terminator to form a polymer solution. An additive slurry was thoroughly mixed into the polymer solution; the slurry was of a composition to provide 1.5 wt % 2,4,6-tris(2,6-dimethyl-4-t-butyl-3-hydroxybenzyl) isocyanurate (Cyanox® 1790, Cytec Industries), 0.5 wt % of a polymer prepared from bis(4-isocyanatocyclohexyl) methane and N-t-butyldiethanolamine (Methacrol® 2462, a registered trademark of E. I. du Pont de Nemours and Company), and 0.6 wt % silicone oil in the final fiber. The resulting spinning solution was dry-spun from DMAc into a column to which a stream of hot nitrogen was provided, and the resulting spandex filaments were coalesced (fused), spin finish was applied, and then the fiber was wound up. The spinning speed was about 275 meters per minute, and the fiber was 37–44 decitex.

EXAMPLE

Polyurethaneureas were made from 2MePO4G, and PO4G for Comparison Sample 1, at several levels of 2,4'-MDI (3.4% NCO in each case), EDA, (10 mole % MPMD in Sample 13) and diethylamine and then dry-spun. Properties of the resulting spandex are reported in the Table.

TABLE

| SAMPLE | 1* | 2*** | 3** | 4**** | 5*** | Comp. 1* |
|---|---|---|---|---|---|---|
| 2,4'-MDI, mole % | 24.7 | 24.7 | 30.2 | 36.0 | 53.2 | 53.2 |
| EDA, mole % | 100 | 90 | 100 | 100 | 100 | 100 |
| MPMD, mole % | 0 | 10 | 0 | 0 | 0 | 0 |
| HSE, % | 75 | 80 | 91 | 88 | 96 | 94 |
| HSE %, at 190° C. | 91 | 93 | | Not Measured | | |
| LP | 0.068 | 0.061 | 0.054 | 0.048 | 0.054 | 0.056 |
| UP | 0.026 | 0.024 | 0.025 | 0.022 | 0.022 | 0.015 |
| Eb, % | 623 | 681 | 679 | 694 | 682 | 614 |
| Set, % | 24 | 25 | 24 | 24 | 26 | 25 |

*Average of 2 spins
**Average of 3 spins
***Average of 4 spins
****Average of 2 spins; HSE measure for 1 spin As can be seen and extrapolated from the data in the Table, levels of at least about 28 mole % 2,4'-MDI are needed to achieve a heat-set efficiency of at least 85% at 175° C. (even when only one chain extender was used). However, even at lower levels, above about 23 mole %, spandex of this invention was made, having HSE ≧85% when heat-set at 190° C. (as is used for hard fibers such as nylon). Above about 55 mole% 2,4'-MDI, unload power would be diminished unacceptably. The data for Comparison Sample 1, for spandex prepared from PO4G, show that such spandex is outside of this invention, having unacceptable unload power.

What is claimed is:

1. Spandex having a heat-set efficiency at approximately 175–190° C. of ≧85%, consisting essentially of the reaction product of:
   (A) poly(tetramethyleneether-co-2-methyltetramethyleneether) glycol;
   (B) a mixture of 1-isocyanato-4-[(4'-isocyanatophenyl) methyl]benzene and 23–55 mole %, based on total diisocyanate, of 1-isocyanato-2-[(4'-isocyanatophenyl) methyl]benzene; and
   (C) at least one chain extender.

2. The spandex of claim 1 having an unload power of ≧0.020 dN/tex.

3. The spandex of claim 1 wherein the chain extender is selected from the group consisting of ethylene diamine, 1,2-propanediamine, 2-methyl-1,5-pentanediamine, 1,3-cyclohexanediamine, 1,3-diaminopentane, and mixtures thereof, and the product of ingredients (A) and (B) contains 2.4–4.6% by weight of NCO-moiety.

4. The spandex of claim 1 wherein the chain extender is a mixture of ethylene diamine and a chain extender selected from the consisting of 1,4-buntanediamine, 1,6-hexanediamine, 1,2-propanediamine, 1,3-propanediamine, 2-methyl-1,5-pentanediamine, 1,4-cyclohexanediamine, 1,3-cyclohexanediamine, and 1,3-diaminopentane, wherein the ethylene diamine is present at 60–95 mole % based on total chain extender.

5. The spandex of claim 1 wherein the 1-isocyanato-2-[(4'-isocyanatophenyl)methyl]benzene is present at a level of 28–55 mole %.

6. A method of making spandex having a heat-set efficiency at approximately 175–190° C. of ≧85%, comprising the steps of:
   (A) contacting poly(tetramethyleneether-co-2-methyltetramethyleneether) with a mixture of 1-isocyanato-4-[(4'-isocyanatophenyl)methyl]benzene and 23–55 mole %, based on total diisocyanate, of 1-isocyanato-2-[(4'-isocyanatophenyl)methyl]benzene to form a product containing approximately 2.4–4.6 weight % NCO moiety;
   (B) adding a solvent to the product of step (A);
   (C) contacting the product of step (B) with at least one chain extender; and
   (D) spinning the product of step (C) to form spandex.

7. The method of claim 6 wherein 1-isocyanato-2-[(4'-isocyanatophenyl)methyl]benzene is present at a level of 25–55 mole %, the chain extender is a mixture of ethylene diamine and a chain extender selected from the group consisting of 2-methyl-1,5-pentanediamine, 1,4-cyclohexanediamine, 1,3-cyclohexanediamine, and 1,3-diaminopentane, wherein the ethylene diamine is present 60–95 mole % based on total chain extender, and the spandex is spun at a speed in excess of about 750 meters per minute.

8. The method of claim 6 wherein the 1-isocyanato-2-[(4'-isocyanatophenyl)methyl]benzene is present at 28–55 mole %.

9. The method of claim 8 wherein the spandex has an unload power of ≧0.020 dN/tex and the chain extender is selected from the group consisting of ethylene diamine, 1,4-butanediamine, 1,6-hexanediamine, 1,2-propanediamine, 1,3-propanediamine, 2-methyl-1,5-pentanediamine, 1,4-cyclohexanediamine, 1,3-cyclohexanediamine, 1,3-diaminopentane, and mixtures thereof.

* * * * *